UNITED STATES PATENT OFFICE.

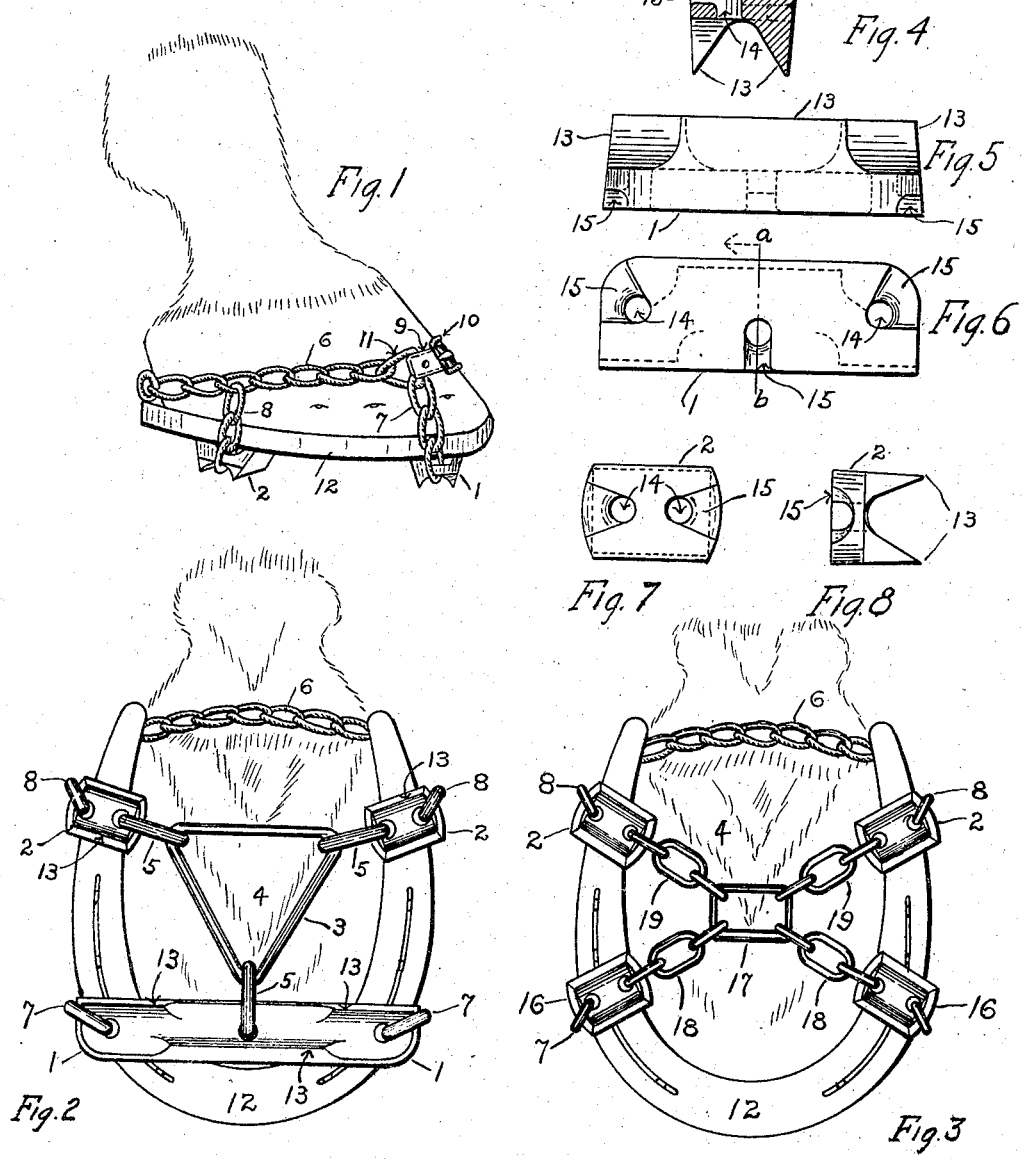

CHARLES H. BENNETT, OF DALTON, MASSACHUSETTS.

OVERSHOE FOR HORSES AND OTHER HOOFED ANIMALS.

944,409.  Specification of Letters Patent.   Patented Dec. 28, 1909.

Application filed February 18, 1909.  Serial No. 478,648.

*To all whom it may concern:*

Be it known that I, CHARLES H. BENNETT, a citizen of the United States, residing at Dalton, in the county of Berkshire and State of Massachusetts, have invented certain new and useful Improvements in Overshoes for Horses and other Hoofed Animals, of which the following is a specification.

My invention relates to a detachable overshoe adapted to prevent slipping on ice, asphalt, and other slippery surfaces, and comprises a tread portion with means for securing the same on the foot. The tread portion is preferably composed of a plurality of jointed or movably connected members forming a flexible, open structure which extends across the bottom of the foot. A preferred form of rigid calks, operating as contact members and designed to afford greater durability and improved gripping or penetrative qualities over the present form of flexible overshoe treads, are incorporated into the tread structure at points where contact is deemed most essential or especially advantageous. The flexible quality of the tread operates to break up snow or other substances tending to adhere to and ball in the cavity of the hoof. Suitable construction is provided in that portion of the tread spanning the frog to prevent injury thereof. The tread portion is flexibly supported in position, and prevented from forward, rearward, downward, or lateral displacement, by adjustable means provided on the hoof, preferably in the form of a band composed of flexibly connected elements secured about the wall of the hoof in such manner as not to have any direct bearing upon sensitive portions of the foot or ankle, the band and the tread portion being united by separate jointed connections distributed around the sides of the hoof.

Having thus described the general character and purpose of my invention, I will proceed to describe a specific useful form of embodiment thereof, in connection with the accompanying drawings, wherein—

Figure 1 is a side view showing a hoof provided with an ordinary horseshoe, and having my improved tread and securing means in place thereon; Fig. 2 is a bottom view of the same; Fig. 3, a view similar to Fig. 2, showing a modified construction of the tread; Fig. 4 is a detail cross-sectional view of the toe calk, on the line *a—b* of Fig. 6; Fig. 5 is a front view of the toe calk; Fig. 6 is a top view of the same, and Figs. 7 and 8 are top and end views, respectively, of the heel calks.

The contact members, jointed to form flexible tread connections, are shown as sharpened calks 1, 2, which may be briefly designated, for the purpose of convenience, as the toe and heel calks, respectively, the former extending preferably wholly across the bottom of the foot and positioned forwardly of the region of maximum width thereof, the latter being disposed rearwardly of said region across the edges of the hoof, preferably in diagonal positions. Each of the calks is connected to a common link 3, which is relatively flat and otherwise proportioned and arranged to protect the frog 4 from injury, by separate jointed elements, which are shown as links 5 and adapted to serve as auxiliary contacts. It should be observed that the link 3 may be of a different formation or immediately jointed to the several calks, without the interposition of an additional element as shown and designed to improve the flexibility of the tread primarily, in conjunction with the functions above described, and that the links 5 may be otherwise constructed and connected or increased in number, as a series of articulated elements; the essential purpose embodied in the tread being to provide a flexible, open structure comprising my improved contact facilities.

The tread is preferably supported in position by a band 6, removably secured around the wall of the hoof and provided at four points with depending chains 7, 8, two on each side of the hoof, which are attached at their lower ends to the calks 1, 2. The band 6 is shown as composed of a series of interlinked relatively-movable links extending around the heel of the hoof and forwardly on either side of the wall thereof to points over the toe calk 1, in connection with a toe-loop or strap 9, provided with a buckle 10, disposed across the front of the hoof and uniting the ends of the chain portion of the band. The band is provided on each side of the hoof, at the points of attachment of the chains 7, with a preferred form of link 11 having a triangular formation and engaged at one of its angles by the terminal link in the band 6, on the corresponding side of the hoof, at another of its angles by the terminal link at the upper end of chain 7, and at the side opposite the first-mentioned angle by the strap 9, thus serving as a common medium for the interconnection of said parts. The angles of the link engaged by the chains are preferably made acute so that the side common to both of the angles may assume an upward inclination. This construction and arrangement of the link 11 prevents forward, rearward and downward displacement of the chain 7, forward, upward and downward displacement of the strap 9, and rearward, upward and downward displacement of the chain portion of the band, at this point. The heel chain 8 is suspended from the band 6 at a point directly over the heel calk 2, on either side of the hoof, the terminal link of the chain 8 and the link provided by the band at this point being mutually interlinked, whereby the chain 8 is prevented from forward, rearward and downward displacement and maintained in a normal-spaced position with relation to the chain 7. The band 6 should be seated well down in the notches formed at the heel on either side of the hoof by the projecting ends of the shoe 12, and when secured in position on the hoof by the tightening of the strap 9 it assumes a taut condition, lying in an upwardly inclined plane at an angle with the sole of the foot. Thus positioned and secured the band 6 is prevented from downward displacement by the natural expansion of the hoof wall and the projecting ends of the shoe 12, and from upward displacement by the tread connections 7, 8, and the rearward extension of the heel or heels of the hoof.

The calks 1, 2, are shown as solid, rigid bodies, preferably of tempered steel having an even top or supporting surface for frictional engagement with the shoe 12 and a longitudinally concave bottom or wearing surface, the latter being provided at its forward and rearward edges with depending extensions in the form of sharpened wedge-like blades 13, which are of equal height and serve as contact members. In the heel calks 2 said members 13 are substantially identical in formation and dimensions, while in the toe calk 1 I prefer to cut away the ends of the forward member and the central portion of the rearward member, whereby the weight of the calk and the liability of injury by contact with the opposite leg of the animal is reduced and the facilities for engagement with the link 5 are improved.

Suitable apertures 14 are provided through the body-portions of the several calks for the reception of the links 5 of the tread and the terminal links at the lower ends of the side chains 7, 8, the apertures provided in calk 1 for engagement with the chains 7 being near the ends thereof and the aperture therein for engagement with the link 5 of the tread being at a central point, while those in the calks 2 are provided at or near each of the ends thereof. To prevent the several links engaging the apertures 14 from becoming interposed between their respective calks and the hoof or shoe, and thereby rendered inflexible and subject to wear, I preferably provide suitable recesses 15 to receive the same by cutting away that portion of the top or supporting surface of the calks between the apertures 14 and the outer edges lying within the field of play of the link. By this provision the several calks may be drawn wholly within the outer margin of the hoof, if necessary, and their positions adjusted with reference to the shoe or edges of the hoof without interference of the engaging links.

The toe calk 1 is preferably made less in length than the maximum width of the hoof so that the engagement of the chains 7 with the expanding margin of the hoof or sides of the shoe will supplement the operative function of the link 11 preventing rearward displacement of the calk.

As a modified form of construction coming within the spirit of my invention I substitute, in place of the calk 1, two separate calks 16 constructed after the pattern of calks 2 and disposed across the edges of the hoof or bottom of the shoe in diagonal positions, and by the provision of a series of chains 18, 19, connecting the several calks to a common central link 17 of modified construction. The tread thus constructed is composed of flexible elements, each movable relatively to any other, and is supported by the band 6 in the manner previously described. The diagonal position of the calks 2 tends to prevent lateral slipping or sliding of the foot, and the substitution of similar calks for the relatively rigid form of calk 1 strengthens this tendency in addition to increasing the flexibility of the tread.

I am aware that other forms of flexible treads comprising contact members have heretofore been invented, but the value of these devices is almost wholly confined to their use as anti-slipping means, particularly where there are no special gripping facilities provided under the toe, which are chiefly useful and necessary in heavy draft work or traveling up an inclined surface, and I have, therefore, constructed my device with the intention of supplying these defects, as is illustrated more particularly by the provision of the toe calk.

Having thus described my invention, I claim as new, and desire to secure by Letters Patent:—

1. In overshoes, the combination with an open flexible tread composed of a plurality of articulated elements, of a contact member movable relatively to the hoof and having a solid body-portion provided with a depending calk.

2. In overshoes, a tread composed of a plurality of flexibly connected elements including a contact member provided with a plurality of wedge-like calks arranged in parallel.

3. In overshoes, an open, flexible tread comprising a plurality of movably connected contact members, each of which members is flexibly supported on the hoof and provided with a solid body-portion having a plurality of spaced contacts tending to engage the surface trod upon.

4. A tread of spaced-chain structure comprising a plurality of contact members distributed around the margin of the hoof, each of said members having a solid body-portion provided with a plurality of depending contacts.

5. A flexible tread for horses, etc., extending across the hoof and over the edges thereof and comprising a plurality of articulated elements including a contact member having a rigid body-portion provided with a depending calk disposed across the hoof forwardly of the region of maximum width.

6. A tread of open, flexible structure composed of a plurality of articulated elements movable relatively to each other and comprising a series of contact members distributed around the margin of the hoof, each having a solid body-portion provided with a depending calk.

7. An overshoe comprising an open, flexible tread having a series of contact members each provided with a plurality of calks and distributed around the margin of the hoof, and means for flexibly supporting the tread in position on the hoof.

8. In overshoes, a tread comprising a plurality of movably connected contact members each having a solid body-portion and a depending wedge-like calk, in combination with means for flexibly supporting the tread on the hoof.

9. In farriery, a contact member having a longitudinal body-portion, spaced contacts depending from the body-portion, and means provided at either end of the body-portion for forming a jointed connection with a support.

10. In an overshoe, the combination with a tread comprising a plurality of chains radiating from a common locus located centrally of the underside of the hoof, and means provided on the wall of the hoof for the support of the tread, of contact members connecting the tread with said supporting means and arranged across the margin of the hoof, each of said contact members having a solid body-portion and a calk depending from the body-portion.

In testimony whereof I hereto affix my signature in presence of two witnesses.

CHARLES H. BENNETT.

Witnesses:
 JNO. J. WHITTLESEY,
 WILLIAM E. BAGG.